(12) United States Patent
Chen et al.

(10) Patent No.: US 12,376,572 B2
(45) Date of Patent: Aug. 5, 2025

(54) INDUSTRIALIZED FISH AND ALGAE FARMING SYSTEM AND METHOD WITH RECIRCULATING WATER

(71) Applicant: Qinghai Photon Ecology Co., Ltd., Haidong (CN)

(72) Inventors: Jiarui Chen, Haidong (CN); Lizhi Li, Haidong (CN); Weijun Bai, Haidong (CN)

(73) Assignee: Qinghai Photon Ecology Co., Ltd., Haidong (CN)

( * ) Notice: Subject to any disclaimer, the term of this patent is extended or adjusted under 35 U.S.C. 154(b) by 385 days.

(21) Appl. No.: 18/130,457

(22) Filed: Apr. 4, 2023

(65) Prior Publication Data
US 2024/0224958 A1    Jul. 11, 2024

(30) Foreign Application Priority Data

Jan. 10, 2023   (CN) .......................... 202310034381.4

(51) Int. Cl.
*A01K 63/04* (2006.01)
*A01G 33/00* (2006.01)
(Continued)

(52) U.S. Cl.
CPC ............ *A01K 63/045* (2013.01); *A01G 33/00* (2013.01); *A01K 61/10* (2017.01); *A01K 63/10* (2017.01); *B01D 21/0009* (2013.01); *B01D 21/01* (2013.01); *B01D 33/21* (2013.01); *B01D 33/50* (2013.01); *C02F 1/004* (2013.01); *C02F 1/488* (2013.01); *C02F 1/5236* (2013.01);
(Continued)

(58) Field of Classification Search
None
See application file for complete search history.

(56) References Cited

U.S. PATENT DOCUMENTS 5,300,225 A * 4/1994 Fischer ............... B01D 33/503
    210/402
5,558,042 A * 9/1996 Bradley ............... A01K 63/045
    210/402
(Continued)

FOREIGN PATENT DOCUMENTS

CN        112931366 A    6/2021

*Primary Examiner* — Robert J Popovics
(74) *Attorney, Agent, or Firm* — Occhiuti & Rohlicek LLP

(57) ABSTRACT

An industrialized fish and algae farming system with recirculating water and method are provided, and the system includes a fish and algae farming system, a fiber rotary disc filter system, and a magnetic loading flocculation system. In accordance with the fish and algae farming system, the aquaculture of fish and algae in the same space is achieved, the algae can transform $CO_2$ exhaled by fish and nutrients, polysaccharides, vitamins and lipids, and then release oxygen to rapidly improve the aquaculture water quality. The fiber rotary disc filter system and the magnetic loading flocculation system can effectively remove suspended particles, grease, algae, bacteria, viruses and the like in aquaculture sewage, thus achieving the deep purification of the aquaculture sewage. The purified water quality reaches the aquaculture standards in fishery and can be directly recycled, and the whole system has no sewage discharge.

5 Claims, 4 Drawing Sheets

(51) Int. Cl.

| | | |
|---|---|---|
| *A01K 61/10* | (2017.01) | |
| *A01K 63/10* | (2017.01) | |
| *B01D 21/00* | (2006.01) | |
| *B01D 21/01* | (2006.01) | |
| *B01D 33/21* | (2006.01) | |
| *B01D 33/50* | (2006.01) | |
| *C02F 1/00* | (2023.01) | |
| *C02F 1/48* | (2023.01) | |
| *C02F 1/52* | (2023.01) | |
| *C02F 11/12* | (2019.01) | |
| *C02F 103/20* | (2006.01) | |

(52) U.S. Cl.
CPC .......... *C02F 11/12* (2013.01); *B01D 2201/16* (2013.01); *B01D 2201/184* (2013.01); *C02F 2001/007* (2013.01); *C02F 2103/20* (2013.01); *C02F 2201/005* (2013.01); *C02F 2301/08* (2013.01); *C02F 2303/16* (2013.01); *C02F 2303/18* (2013.01)

(56) References Cited

U.S. PATENT DOCUMENTS

| | | | |
|---|---|---|---|
| 7,785,479 B1* | 8/2010 | Hosford | B01D 21/0018 |
| | | | 210/801 |
| 10,589,201 B2* | 3/2020 | Larsson | B01D 33/21 |
| 10,888,807 B2* | 1/2021 | Harden | B01D 33/21 |
| 12,048,890 B2* | 7/2024 | Harden | B01D 33/39 |
| 12,178,195 B1* | 12/2024 | Holm | A01K 63/047 |
| 12,178,196 B2* | 12/2024 | Chen | B01D 29/68 |
| 2024/0224957 A1* | 7/2024 | Chen | B01D 29/56 |
| 2024/0224958 A1* | 7/2024 | Chen | A01G 33/00 |
| 2024/0375028 A1* | 11/2024 | Dach | B01D 33/11 |

\* cited by examiner

INDUSTRIALIZED FISH AND ALGAE FARMING SYSTEM AND METHOD WITH RECIRCULATING WATER

CROSS REFERENCE TO RELATED APPLICATION

This application claims the priority of Chinese Patent Application No. 202310034381.4, entitled "Industrialized Fish And Algae Farming System And Method With Recirculating Water" filed with the Chinese Patent National Intellectual Property Administration on Jan. 10, 2023, which is incorporated herein by reference in its entirety.

TECHNICAL FIELD

The present disclosure belongs to the technical field of recirculating aquaculture, and in particular relates to an industrialized fish and algae farming system and method with recirculating water.

BACKGROUND

Recirculating aquaculture system is a novel aquaculture mode, through which the aquaculture sewage can be recycled again after being treated by a series of water treatment units. The recirculating aquaculture system can remove harmful pollutants in the water body and purify water environment through engineering technology and facilities, which not only solves the problem of low utilization of water resources, but also provides a stable and high-quality environment for fish culture, thus providing favorable conditions for high-density aquaculture.

Microalgae can transform inorganic nitrogen and phosphorus nutrients such as $NH_4^+$—N, $NH_3$—N, $NO_2^-$N, $NO_3^-$—N, $PO_4^{3-}$—P in sewage into own materials of algae cells such as protein, polysaccharides, fat, vitamins and nucleic acids through photosynthesis. The sewage treatment technology based on microalgae culture can achieve sewage purification, nutrient recovery and the output of high value-added biomass at the same time, and such technology has been applied to the treatment of aquaculture sewage. For example, in Chinese Patent CN112931366A, a microalgae-driven high-density intensive aquatic product ecological aquaculture system and a method as well as an application thereof are disclosed. In the method, tail water generated in a fish culture zone is received for bacteria and microalgae culture, and algae liquid rich in microalgae biomass obtained by culture is used as baits for shellfish culture. In the method, the tail water generated by fish culture is subjected to ex-situ purification of microalgae and bacteria, but the tail water generated by fish culture is not recycled for fish culture.

Strictly speaking, the design of the system is not mature enough, the stability of the equipment is poor, and the contents of $NH_4^+$—N, $NH_3$—N and $NO_2^-$—N in the water cannot be effectively controlled. The above problems must be solved by changing much water, and the discharge is inevitable.

SUMMARY

To this end, an objective of the present disclosure is to provide an industrialized fish and algae farming system and method with recirculating water to achieve the recycling of the aquaculture sewage.

To achieve the objective above, the present disclosure provides the following technical solution:

The present disclosure provides an industrialized fish and algae farming system with recirculating water. The system comprises: a fish and algae farming system, a fiber rotary disc filter system, and a magnetic loading flocculation system.

The fish and algae farming system comprises a fishpond body, a water inlet device, and a water outlet device.

The fiber rotary disc filter system comprises a first fiber rotary disc filter device and a second fiber rotary disc filter device. The first fiber rotary disc filter device is located in a first filter pond, and the second fiber rotary disc filter device is located in a second filter pond: the first fiber rotary disc filter device and the second fiber rotary disc filter device each comprise a fiber rotary disc filter, a backwash device, a sludge discharge device, and a supporting electric control device. The first fiber rotary disc filter device and the second fiber rotary disc filter device have equal filtration flux for the same aquaculture sewage. The filtering pores of filter cloths in the first fiber rotary disc filter have a diameter ranging from 15 μm to 30 μm, and the filtering pores of filter cloths in the second fiber rotary disc filter have a diameter ranging from 1 μm to 5 μm. A filtered water collecting tank is arranged between the first filter pond and the second filter pond. The filtered water collecting tank is provided with a filtered water outlet: the first fiber rotary disc filter device and the second fiber rotary disc filter device share the filtered water collecting tank, the filtered water outlet, a back suction pump and a drain outlet.

The water outlet device of the fish and algae farming system communicates with the first filter pond and the second filter pond through pipelines, respectively.

The filtered water outlet of the fiber rotary disc filter system communicates with the water inlet device of the fish and algae farming system through a pipeline.

The drain outlet of the fiber rotary disc filter system communicates with a water inlet of the magnetic loading flocculation system through a pipeline.

The magnetic loading flocculation system comprises a mixing pond, a coagulation pond, a flocculation pond, a sedimentation pond, a magnetic powder recovery device, and a sludge dewatering device.

The sedimentation pond of the magnetic loading flocculation system is provided with a clarified water outlet, and the clarified water outlet communicates with the first filter pond and the second filter pond through pipelines.

In some embodiments, the water inlet device comprises a plurality of water inlet pipes. The water inlet pipes are distributed on a side wall of the fishpond body, and fishpond water inlets are arranged in a tangential direction at equal intervals.

In some embodiments, the fiber rotary disc filter comprises a central rotary drum and a rotary disc. The rotary disc is fixed around the central rotary drum and communicates with the central rotary drum through a communication hole. Both sides of the rotary disc are provided with the filter cloths. The first fiber rotary disc filter device and the second fiber rotary disc filter device have equal filtration flux for same aquaculture sewage.

In some embodiments, the sludge discharge device comprises sludge discharge pipes arranged at bottoms of the first filter pond and the second filter pond, and the sludge discharge pipes communicate with the back suction pump through pipelines. The sludge discharge pipes in the first filter pond and the second filter pond are provided with electric valves.

In some embodiments, the magnetic loading flocculation system comprises the mixing pond, the coagulation pond, the flocculation pond, the sedimentation pond, the magnetic powder recovery device, and the sludge dewatering device communicating to one another in sequence.

The present disclosure further provides an industrialized fish and algae farming method with recirculating water employing the industrialized fish and algae farming system with recirculating water of the solution above. The method comprises the following steps:

1) injecting water into the fishpond body, and adding pre-cultured high-activity microalgae into the fishpond until the algae density of the aquaculture water body is 50 mg/L to 1,000 mg/L:
2) releasing the fish fry, and feeding feed into the fishpond every 3 h to 5 h; and
3) during aquaculture, when the microalgae are at the final stage of the growth stationary phase and about to enter the decline phase, turning off the first fiber rotary disc filter, and turning on the second fiber rotary disc filter to prevent the microalgae from returning to the fishpond body, thus making the captured microalgae enter the magnetic loading flocculation system by the backwash device for further treatment, and replenishing a volume of the pre-cultured high-activity microalgae to make the algae density of the aquaculture water body be 50 mg/L to 1,000 mg/L, and harvesting fish after 150 days to 200 days.

In some embodiments, the aquaculture density of fish fry in the step 1) is 25 kg/m$^3$ to 35 kg/m$^3$.

In some embodiments, when the aquaculture density of the water body is greater than or equal to 30 kg/m$^3$ and less than 60 kg/m$^3$, the water inlet flow and the water outlet flow are set to be 35 m$^3$/h to 45 m$^3$/h: when the aquaculture density of the water body is greater than or equal to 60 kg/m$^3$ and less than 100 kg/m$^3$, the water inlet flow and the water outlet flow are set to be 55 m$^3$/h to 65 m$^3$/h; and when the aquaculture density of the water body is greater than or equal to 100 kg/m$^3$ and less than 200 kg/m$^3$, the water inlet flow and the water outlet flow are set to be 70 m$^3$/h to 90 m$^3$/h.

In some embodiments, during farming, the dissolved oxygen in the aquaculture water body is 5 mg/L to 12 mg/L.

In some embodiments, the microalgae are able to pass through the filter cloths in the first fiber rotary disc filter but not passable through the filter cloths in the second fiber rotary disc filter; and the microalgae comprises one or more of *Chlorella*, *Nannochloropsis oceanica*, *Dunaliella salina*, and *Chlamydomonas reinhardtii*.

The present disclosure has the beneficial effects that the industrialized fish and algae farming system with recirculating water comprises the fish and algae farming system, the fiber rotary disc filter system, and the magnetic loading flocculation system. The fiber rotary disc filter system comprises the first fiber rotary disc filter device and the second fiber rotary disc filter device, and the first fiber rotary disc filter device and the second fiber rotary disc filter device have the equal filtration flux to the same aquaculture sewage. The filtering pores of filter cloths in the first fiber rotary disc filter have a diameter ranging from 15 μm to 30 μm, and the filtering pores of filter cloths in the second fiber rotary disc filter have a diameter ranging from 1 μm to 5 μm. The water outlet device of the fish and algae farming system respectively communicates with the first filter pond and the second filter pond through pipelines and electric valves. The filtered water outlet of the fiber rotary disc filter system communicates with the water inlet device of the fish and algae farming system through a pipeline and a pump. The drain outlet of the fiber rotary disc filter system communicates with the water inlet of the magnetic loading flocculation system through the pipeline, and the clarified water outlet of the sedimentation pond of the magnetic loading flocculation system communicates with the first filter pond and the second filter pond through pipelines and electric valves. During the normal recirculating of water, the first fiber rotary disc filter with the filtering pores having a diameter of 15 μm to 30 μm is turned on, thus microalgae can return to a fishpond through the first fiber rotary disc filter for repeated use. Suspended matters with larger particle diameter, such as fish dung and residual bait, either directly sink to the bottom of the filter pond, or are captured by the filter cloths of the first fiber rotary disc filter, and finally enter the magnetic loading flocculation system by the sludge discharge device or the back wash device for further deep purification. When the microalgae in the aquaculture water body need to be removed, the second fiber rotary disc filter with the filtering pores having a diameter of 1 μm to 5 μm is turned on for capturing, such that the microalgae cannot return to the fishpond and enter the magnetic loading flocculation system by the backwash device for further deep purification. In the present disclosure, the fiber rotary disc filter system can perform filtration, and has a sedimentation function. Suspended matters with larger particle diameter sink directly to the bottom of the filter pond, which greatly reduces both the amount of sludge on the filter cloths and the amount of backwashing water. In the present disclosure, the magnetic loading flocculation system not only can effectively remove the substances, such as suspended matters with larger particle diameter, macromolecular proteins, grease and the like, in the sewage discharged by the fiber rotary disc filter system, and but also can fully remove microalgae, bacteria, viruses and the like with smaller particle diameter. The clarified water has a total solid content of less than 2 mg/L and the turbidity of less than 1.0 NTU, and the treatment cost per ton of sewage is about 0.1 yuan. The purified water quality reaches the aquaculture standards in fishery and can be directly recycled. The whole system has no sewage discharge, and only the water carried by daily evaporation and solids discharged from a dewatering machine needs to be replenished periodically to the fishpond.

In accordance with the industrialized fish and algae farming method with recirculating water provided by the present disclosure, the aquaculture sewage selectively passes through the first fiber rotary disc filter or the second fiber rotary disc filter, wherein the diameter of pores of the filter cloths of the first fiber rotary disc filter meets the requirements that microalgae can pass through, but suspended matters with the large particle diameter cannot pass through, and the diameter of pores of the filter cloths of the second fiber rotary disc filter meets the requirements that microalgae cannot pass through, such that suspended matters with the particle diameter greater than the diameter of pores of the filter cloths of the first fiber rotary disc filter, such as fish dung and residual bait, can be quickly removed from the fishpond, and the microalgae can return to the fishpond and be cultured in the fishpond with fish. Through photosynthesis, the microalgae can transform $CO_2$ exhaled by fish and nutrients such as nitrogen and phosphorus dissolved into the water into own materials of algae cells such as protein, polysaccharides, lipids, vitamins and the like, and then release oxygen to rapidly improve aquaculture water quality and significantly reduce the demand for artificial aeration. In the present disclosure, the aquaculture sewage is regarded as a valuable resource. In the process of culturing the fish and microalgae together in the fishpond, not only can the purification and recovery of nutrients of the aquaculture sewage be achieved, but also the microalgae biomass with high added value can be output.

In the present disclosure, the fiber rotary disc filter system can quickly remove the microalgae at the final stage of growth stationary phase from the fishpond, thus avoiding the water quality deterioration caused by microalgae. The filtration accuracy of the fiber rotary disc filter system may reach 1 μm, thus more than 99% of suspended matters in the aquaculture sewage can be filtered, and the total solid content of the filtered water is less than 5 mg/L.

In the present disclosure, the fiber rotary disc filter system can perform filtration, and has a sedimentation function. The suspended matters with large particle diameter in the aquaculture sewage sink directly, thereby effectively avoiding the water quality deterioration caused by crushing, significantly reduce the amount of sludge on the filter cloths, and reduce the amount of backwashing water. In the present disclosure, after the aquaculture sewage is treated by the fiber rotary disc system, only the sewage accounting for 2% to 3% of the aquaculture volume needs the further deep purification of the magnetic loading flocculation system every day. In the present disclosure, the magnetic loading flocculation system can effectively remove the substances such as suspended matters with large particle diameter, macromolecular proteins, grease, microalgae, bacteria, viruses and the like in the sewage. The clarified water has a total solid content of less than 2 mg/L and the turbidity of less than 1.0 NTU, and the water quality reaches aquaculture standards in the fishery. The obtained solids may serve as the organic fertilizer, and the treatment cost per ton of sewage is about 0.1 yuan.

In the present disclosure, the microalgae having absolutely dominant can inhibit the rapid proliferation of harmful bacteria in the aquaculture water body and significantly reduce the use of fish medicine in the aquaculture process, thus achieving a true sense of ecological aquaculture. In addition, active functional groups on the surface of microalgae may also promote the aggregation of tiny suspended matters to significantly improve the transparency of aquaculture water body. In the present disclosure, the reuse rate of the aquaculture sewage may reach 99.8%, and the high-density aquaculture of fish with low energy consumption and high stability can be achieved.

DETAILED DESCRIPTION OF THE EMBODIMENTS

Figure 1:
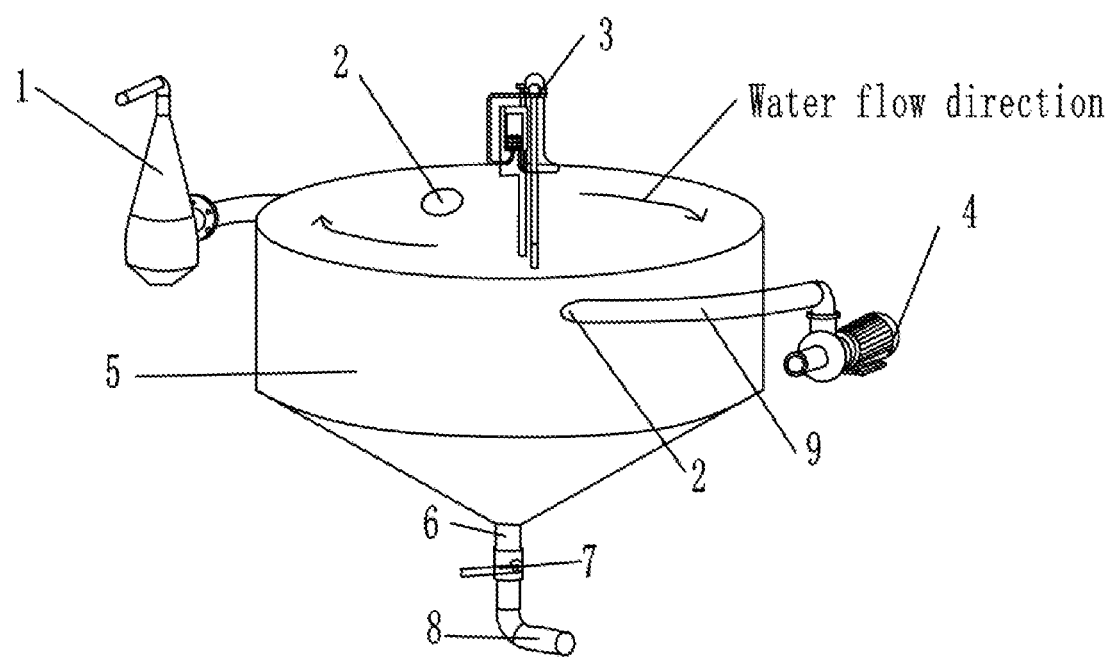
FIG. 1 is a schematic diagram of a fish farming system, in the figure: 1—aeration cone, 2—water inlet of fishpond: 3—online detection assembly: 4—water pump: 5—fishpond body: 6—water outlet of fishpond: 7—water outlet valve: 8—water outlet pipe of fishpond: 9—water inlet pipe.

The present disclosure provides an industrialized fish and algae farming system with recirculating water. The system comprises a fish and algae farming system. The fish and algae farming system comprises a fishpond body, a water inlet device, and a water outlet device. A fiber rotary disc filter system comprises a first fiber rotary disc filter device and a second fiber rotary disc filter device: the first fiber rotary disc filter system is located in a first filter pond: the second fiber rotary disc filter device is located in a second filter pond. The first fiber rotary disc filter device and the second fiber rotary disc filter device each comprise a fiber rotary disc filter, a backwash device, a sludge discharge device, and a supporting electric control device. The first fiber rotary disc filter device and the second fiber rotary disc filter device have the equal filtration flux for the same aquaculture sewage. The filtering pores of filter cloths in the first fiber rotary disc filter have a diameter ranging from 15 μm to 30 μm, and the filtering pores of filter cloths in the second fiber rotary disc filter have a diameter ranging from 1 μm to 5 μm.

In the present disclosure, a filtered water collecting tank is provided between the first filter pond and the second filter pond, and the filtered water collecting tank is provided with a filtered water outlet. The first fiber rotary disc filter device and the second fiber rotary disc filter device share the filtered water collecting tank, the filtered water outlet, a back suction pump, and a sewage suction port. The water outlet device of the fish and algae farming system respectively communicates with the first filter pond and the second filter pond through pipelines. The filtered water outlet of the fiber rotary disc filter system communicates with the water inlet device of the fish and algae farming system through a pipeline, the drain outlet of the fiber rotary disc filter system communicates with a sewage inlet of a magnetic loading flocculation system through a pipeline. The magnetic loading flocculation system comprises a mixing pond, a coagulation pond, a flocculation pond, a sedimentation pond, a magnetic powder recovery device, and a sludge dewatering device. The sedimentation pond of the magnetic loading flocculation system is provided with a purified water outlet, and the purified water outlet communicates with the first filter pond and the second filter pond through pipelines.

In the present disclosure, the fish and algae farming system, the fiber rotary disc filter system and the magnetic loading flocculation system work together to achieve zero-discharge recirculating aquaculture.

In the present disclosure, the fish and algae farming system comprises a fishpond body, a water inlet device, and a water outlet device.

In the present disclosure, the fishpond body is cylindrical in shape. A ratio of the diameter to the height of the fishpond body is preferably (9 to 10):(1 to 2), more preferably 9.5:1.5. According to the present disclosure, the specific diameter and height of the fishpond body are not particularly limited, but are preferably set according to the actual aquaculture requirements.

During specific embodiment of the present disclosure, the diameter of the fishpond body is preferably 9 m to 10 m, the height of the fishpond body is preferably 1.45 m to 1.78 m, and the fishpond body is preferably made of a polypropylene material.

In the present disclosure, at the position where the sidewall is 30 cm to 50 cm away from the top of the fishpond body, a plurality of through holes are preferably provided, and the through holes have a function of overflowing floating objects such as oil stains on the surface of the water body.

In the present disclosure, the fish and algae farming system preferably comprises a plurality of fishpond bodies, the number of the fishpond bodies is specifically determined according to the aquaculture requirements and sites. The plurality of fishpond bodies are connected in parallel, and the plurality of fishpond bodies share the water inlet device and the water outlet device.

In the present disclosure, the fish and algae farming system comprises a water inlet device. The water inlet device comprises a plurality of water inlet pipes, and the water inlet pipes communicate with a water pump. Each water inlet pipe is provided with water inlets of fishpond along the tangent of the sidewall of the fishpond body, and the number of the fishpond water inlets is preferably 3 to 4. The fishpond water inlets are preferably arranged at equal intervals, which is more conducive to the formation of vortex in the center of the fishpond and the smoothness of the liquid level.

In the present disclosure, the fish and algae farming system comprises a water outlet device. The water outlet device is preferably located at the bottom of the fishpond body. The water outlet device comprises a water outlet of fishpond and a water outlet of fishpond; and a water outlet valve is preferably arranged on the water outlet pipe of the fishpond.

In the present disclosure, the fish and algae farming system preferably comprises an aeration system, which preferably comprises an aeration cone.

In the present disclosure, the fish and algae farming system preferably comprises an online detection system which is configured to detect temperature, dissolved oxygen, pH value, ammonia nitrogen and nitrite nitrogen.

In an embodiment of the present disclosure, FIG. 1 is a schematic diagram of the fish and algae farming system, in the figure: 1 refers to aeration cone, 2 refers to water inlet of fishpond: 3 refers to online detection assembly: 4 refers to water pump: 5 refers to fishpond body: 6 refers to water outlet of fishpond: 7 refers to water outlet valve: 8 refers to water outlet pipe of fishpond: 9 refers to water inlet pipe.

In the present disclosure, the fiber rotary disc filter system comprises a first fiber rotary disc filter device and a second fiber rotary disc filter device: the first fiber rotary disc filter device is located in a first filter pond, and the second fiber rotary disc filter device is located in a second filter pond. In the present disclosure, the water outlet device of the fish and algae farming system flows into the first filter pond or the second filter pond by means of gravity, and the pipeline is preferably provided with an electric valve.

In the present disclosure, the pond wall of the first filter pond is preferably provided with a water inlet of first filter pond, and the pond wall of the second filter pond is preferably provided with a water inlet of second filter pond. A filtered water collecting tank is preferably provided between the first filter pond and the second filter pond, and the bottom of the filtered water collecting tank is provided with a filtered water outlet.

In the present disclosure, the first fiber rotary disc filter device and the second fiber rotary disc filter device each comprise a fiber rotary disc filter, a backwash device, a sludge discharge device, and a supporting electric control device. In the present disclosure, the fiber rotary disc filter preferably comprises a central rotary drum and a rotary disc. The rotary disc is fixed around the central rotary drum and communicates with the central rotary drum through a communication hole. Both sides of the rotary disc are provided with filter cloths. Base fabric for the filter cloths is preferably made of polyester fiber, and the fluff on the base fabric is preferably made of polyamide fiber.

In the present disclosure, the first fiber rotary disc filter device and the second fiber rotary disc filter device have the equal filtration flux for the same aquaculture sewage so as to maintain the constant liquid level in the fishpond. The number of rotary discs for the first fiber rotary disc filter and the second fiber rotary disc filter is determined according to the volume of the aquaculture sewage to be treated.

In the present disclosure, the filtering pores of the filter cloths in the first fiber rotary disc filter have a diameter ranging from 1 μm to 5 μm, preferably 1 μm. The filtering pores of the filter cloths in the second fiber rotary disc filter have diameter ranging from 15 μm to 30 μm, preferably 30 μm.

In the present disclosure, the filtered water collecting tank is provided between the first filter pond and the second filter pond, and the filtered water collecting tank is provided with the filtered water outlet. The first fiber rotary disc filter device and the second fiber rotary disc filter device share the filtered water collecting tank, the filtered water outlet, a back suction pump and a drain outlet.

In the present disclosure, the water outlet device of the fish and algae farming system respectively communicates with the first filter pond and the second filter pond through pipelines.

In the present disclosure, the filtered water outlet of the fiber rotary disc filter system communicates with the water inlet device of the fish and algae farming system through a pipeline, preferably provided with a water pump.

Figure 2:
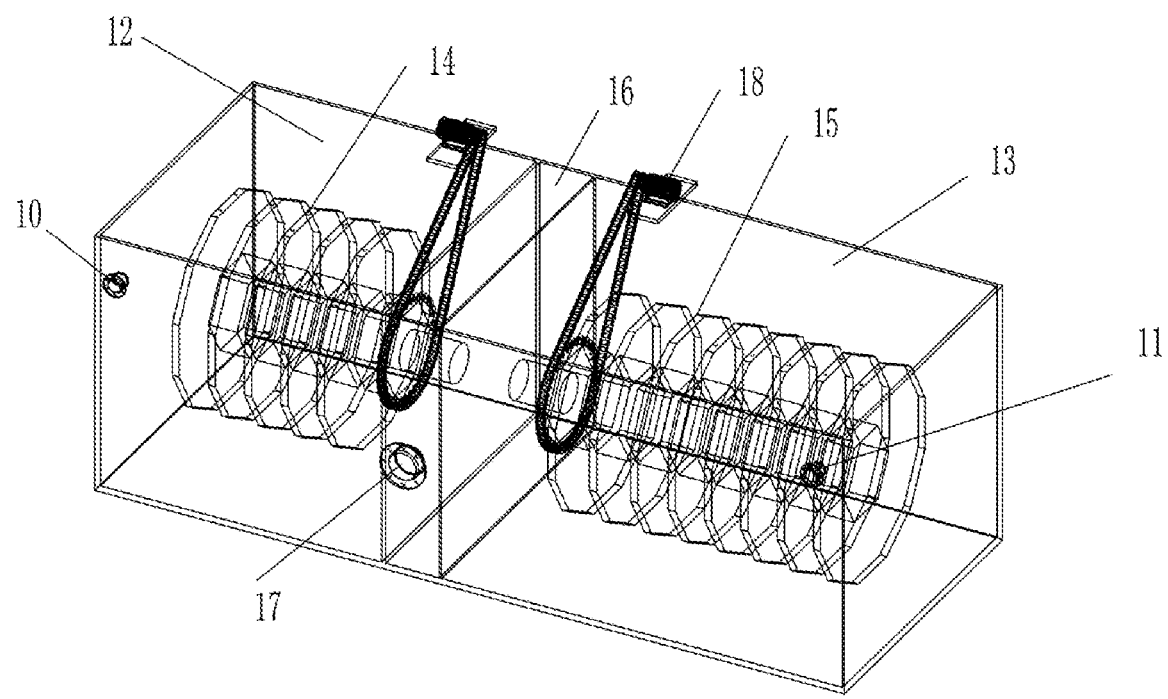
FIG. 2 is a schematic diagram illustrating a fiber rotary disc filter system and a supporting electric control device, in the figure: 10—water inlet of first filter pond: 11—water inlet of second filter pond: 12—first filter pond: 13—second filter pond: 14—first fiber rotary disc filter device: 15—second fiber rotary disc filter device: 16—filtered water collecting tank: 17—filtered water outlet: 18—supporting electric control device.

In an embodiment of the present disclosure, FIG. 2 is a schematic diagram illustrating the fiber rotary disc filter system and the supporting electric control device, in the figure: 10 refers to water inlet of first filter pond: 11 refers to water inlet of second filter pond: 12 refers to first filter pond: 13 refers to second filter pond: 14 refers to first fiber rotary disc filter device: 15 refers to second fiber rotary disc filter device: 16 refers to filtered water collecting tank: 17 refers to filtered water outlet: 18 refers to supporting electric control device.

In the present disclosure, the first fiber rotary disc filter device and the second fiber rotary disc filter device can operate independently but cannot be turned on synchronously. The first fiber rotary disc filter device and the second fiber rotary disc filter device are controlled by electric valves to introduce water. During the normal recirculating of water, the first fiber rotary disc filter with the filtering pore aperture of 15 μm to 30 μm is turned on, thus microalgae can return to a fishpond through the first fiber rotary disc filter for repeated use. Suspended matters with larger particle diameter, such as fish dung and residual bait, either directly sink to the bottom of the filter pond, or are captured by the filter cloths of the first fiber rotary disc filter, and finally enter the magnetic loading flocculation system by the backwash device or the sludge discharge device or for further deep purification. When the microalgae in the aquaculture water body need to be removed, the second fiber rotary disc filter with the filtering pore aperture of 1 μm to 5 μm is turned on for capturing, such that the microalgae enter the magnetic loading flocculation system by the backwash device for further deep purification. After the microalgae of the water body are removed, the pre-cultured high-activity microalgae need to be added into the fishpond again.

In the present disclosure, during the filtering of the fiber rotary disc filtering system, the suspended matters with large particle diameter in the sewage are blocked by the filter cloths, clear water passes through the filter cloths to flow into the central rotary drum by means of gravity and then flows out of the fiber rotary disc filter system through the filtered water outlet. A part of suspended matters with large particle diameter blocked by the filter cloths is attached to the surface of the filter cloths, and the other part of the suspended matters with large particle diameter sinks to the bottom of the fishpond. With the increase of attachments on the filter cloths, the filtering resistance is increased, and the liquid level in the filter pond gradually rises; and when the liquid level reaches a backwashing set value, the back suction pump is turned on by the supporting electrical control system to start the backwashing process. During normal filtering, the rotary disc is in a static state, which is beneficial to the direct sinking of the suspended matters in the aquaculture sewage.

In the present disclosure, in the backwashing process of the fiber rotary disc filter system, the rotary disc rotates at a speed of about 1 r/min, and the supporting electrical control system is configured to control the electric valve connected to the pipeline of the back suction pump to clean each rotary disc in turn. The back suction pump is configured to suck the surface of the filter cloths at a negative pressure, the clear water passing through the filter cloths is configured to clean the filter cloths from inside to outside, and the sludge accumulated on the filter cloths is rinsed off and sequentially passes through the back suction pump and drain outlet to enter the magnetic loading flocculation system for further deep purification. After all rotary discs are cleaned, the liquid level in the filter pond returns to the normal. The filtering is carried out as usual during backwashing, and the amount of backwashing water accounts for only about 1% of the amount of the filtered water.

In the present disclosure, the sludge discharge device preferably comprises sludge suction pipes arranged at the bottoms of the first filter pond and the second filter pond, and the sludge discharge pipes communicate with the back suction pump through pipelines. The sludge discharge pipes in the first filter pond and the second filter pond are provided with electric valves. The back suction pump is preferably connected with the supporting electric control system, and the sludge discharge device can be started according to working conditions.

Figure 3:
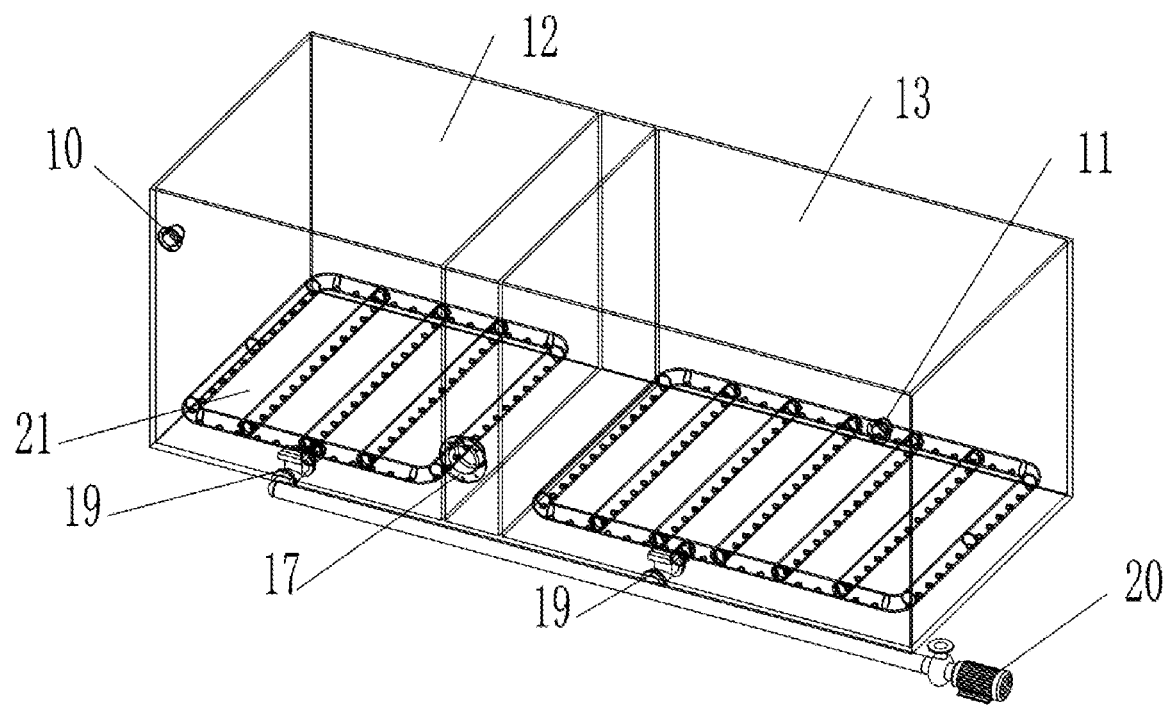
FIG. 3 is a schematic diagram of a sludge discharge device, in the figure: 10—water inlet of first filter pond: 11—water inlet of second filter pond: 12—first filter pond: 13—second filter pond: 17—filtered water outlet: 19—sewage suction port: 20—back suction pump: 21—sewage suction pipe.

In the present disclosure, FIG. 3 is a schematic diagram of the sludge discharge device, in the figure: 10 refers to water inlet of first filter pond: 11 refers to water inlet of second filter pond: 12 refers to first filter pond: 13 refers to second filter pond: 17 refers to filtered water outlet: 19 refers to sewage suction port: 20 refers to back suction pump: 21 refers to sewage suction pipe.

In the present disclosure, the sludge discharge device is used for discharging sludge, and the sewage, after being discharged, enters the magnetic loading flocculation system for further deep purification treatment.

In the present disclosure, the drain outlet of the fiber rotary disc filter system communicates with the water inlet of the magnetic loading flocculation system through a pipeline.

In the present disclosure, the industrialized fish and algae farming system with recirculating water comprises the magnetic loading flocculation system. The magnetic loading flocculation system comprises the mixing pond, the coagulation pond, the flocculation pond, the sedimentation pond, the magnetic powder recovery device and the sludge dewatering device communicating in sequence.

In the present disclosure, the clarified water outlet of the sedimentation pond of the magnetic loading flocculation system communicates with the first filter pond and the second filter pond through pipelines and electric valves.

In the present disclosure, the sewage discharged from the back suction pump of the fiber rotary disc filter system enters the mixing pond through the pipeline, and is sequentially treated by the coagulation pond, the flocculation pond and the sedimentation pond. Flocs containing magnetic powder are sedimented in the sedimentation pond, the clarified water flows into the filter pond, a part of the flocs containing the magnetic powder directly returns to the coagulation pond by the sludge pump, and the other part of the flocs containing the magnetic powder enters the magnetic powder recovery device for magnetic powder recovery. The magnetic powder directly enters the coagulation pond. The sludge is treated by a dewatering device, in which the solids may serve as organic fertilizer and the effluent enters the sedimentation pond.

Figure 4:
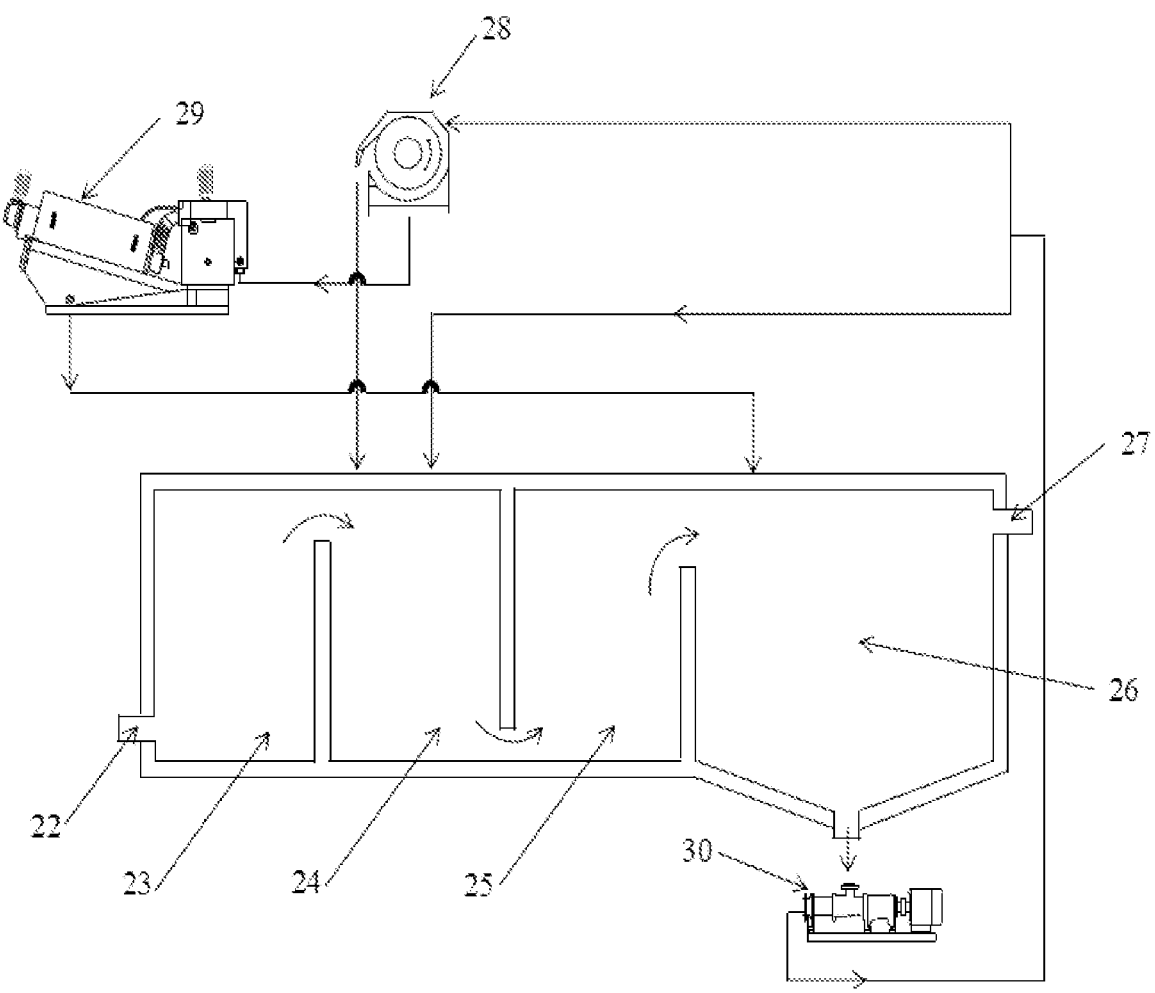
FIG. 4 is a schematic diagram of a working principle of a magnetic loading flocculation system, in the figure: 22—sewage inlet: 23—mixing pond: 24—coagulationpond: 25—flocculation pond: 26—sedimentation pond: 27—purified water outlet: 28—magnetic powder recovery device: 29—sludge dewatering device: 30—sludge pump.

In the present disclosure, FIG. 4 is a schematic diagram of a working principle of a magnetic loading flocculation system, in the figure: 22 refers to sewage inlet: 23 refers to mixing pond: 24 refers to coagulation pond: 25 refers to flocculation pond: 26 refers to sedimentation pond: 27 refers to purified water outlet: 28 refers to magnetic powder recovery device: 29 refers to sludge dewatering device: 30 refers to sludge pump.

In the present disclosure, the mixing pond, the coagulation pond and the flocculation pond each are preferably provided with a stirring device.

In the present disclosure, a delivery pump containing magnetic powder flocs is a screw pump, which serves to deliver the magnetic powder flocs in the sedimentation pond to the coagulation pond or the magnetic powder recovery device.

In the present disclosure, a purified water outlet of the magnetic loading flocculation system preferably communicates with the first filter pond water inlet and the second filter pond water inlet of the fiber rotary disc filter system through pipelines.

In the present disclosure, the industrialized fish and algae farming system with recirculating water preferably further comprises a microalgae culture system, and the microalgae culture system preferably adopts a photo-fermentation culture system. The photo-fermentation culture system is a lighting facility which can increase the light intensity, light quality and photoperiod in the traditional fermentation system. The system retains the advantages of fermentation culture and overcomes the defect of low pigment content of microalgae caused by dark culture, and thus microalgae with high pigment content and biomass concentration can be efficiently obtained in a large scale. In the present disclosure, the photo-fermentation culture system is preferably available from Bio 5000 full-automatic three-stage photo-fermentation system of Anhui Saide Qirui biotechnology Co., LTD., which is composed of three full-automatic stainless steel fermentation ponds of 100 L, 1,000 L and 5,000 L, as well as supporting lighting devices, feed ponds, corresponding pipelines, valves, operating platforms, intelligent electrical control systems, and the like; and of which operating parameters such as stirring speed, temperature, pH, DO, pond pressure, gas flow rate, light intensity, light quality and photoperiod can be automatically controlled.

In the present disclosure, the industrialized fish and algae farming system with recirculating water preferably further comprises a disinfection system. The disinfection system preferably comprises ozone and an ultraviolet disinfection device. In the present disclosure, the mixing pond of the magnetic loading flocculation system is provided with an ozone inlet, and ozone is used for the disinfection treatment of the sewage discharged from the fiber rotary disc filter system, and the feeding rate of the ozone is 15 g/h to 25 g/h, preferably 18 g/h to 22 g/h, more preferably 20 g/h. In the present disclosure, the clarified water outlet of the magnetic loading flocculation system is provided with an ultraviolet sterilizer. A plurality of ultraviolet lamps are arranged in the ultraviolet sterilizer, the power of the ultraviolet lamp is preferably 50 w to 100 w, more preferably 75 w. The brand of the ultraviolet lamp may be Phillips.

In the present disclosure, the industrialized fish and algae farming system with recirculating water preferably further comprises a water quality online monitoring system, which is configured for online detection of dissolved oxygen, pH, water temperature and residual chlorine in the fishpond in real time.

The present disclosure further provides an industrialized fish and algae farming method with recirculating water, which employs the industrialized fish and algae farming system with recirculating water of the solution above. The method comprises the following steps:
1) water is injected into the fishpond body, and pre-domesticated microalgae species are added into the fishpond body, wherein the adding amount of the microalgae species is 50 1,000 mg/L water body to 1,000 mg/L water body:
2) the fish fry are released, and feed are fed into the fishpond every 3 h to 5 h; and
3) during aquaculture, when the microalgae are at the final stage of the growth stationary phase and about to enter the decline phase, the first fiber rotary disc filter is turned off and the second fiber rotary disc filter is turn on to prevent the microalgae from returning to the fishpond, thus the captured microalgae enters the magnetic loading flocculation system by the backwash device for further treatment, and a certain volume of pre-domesticated high-activity microalgae are replenished to make the algae density in the aquaculture water body be 50 mg/L to 1,000 mg/L, and after 150 days to 200 days fish is harvested.

In the present disclosure, the water is injected into the fishpond body, and then pre-domesticated microalgae species are added into the fishpond body until the algae density in the aquaculture water body is 50 mg/L to 1000 mg/L.

In the present disclosure, the inlet water is preferably tap water, the water influent flow rate of the inlet water is preferably 60 m³/h. In the present disclosure, when the height of the water surface in the fishpond is 15 cm to 25 cm away from the top of the fishpond, water inflow is completed. Taking a fishpond body with the volume of 100 m³ as an example, the time for water inflow is preferably 1 h to 2 h, more preferably 1.5 h. After the water inflow is completed, the pre-cultured microalgae are added into the fishpond until the algae density in the aquaculture water body is 50 mg/L to 1,000 mg/L, and the algae density is preferably 100 mg/L to 500 mg/L, more preferably 200 mg/L. After the adding of microalgae is completed, the first fiber rotary disc filter device is turned on, and after the first fiber rotary disc filter device is operated for 1 h to 2 h, the fish fry is released into the fishpond. The species of the fish fry are not particularly limited by the present disclosure, and conventional farmed fish in the field are all available. In the specific embodiment of the present disclosure, the species of the fish fry include salmon, *Schizothorax davidi*, *Oncorhynchus mykisst*, *Plectropomus leopardus*, *Lateolabras janopicus* or *Siniperca chuatsi*. In the present disclosure, the breed density of the fish fry is preferably 25 kg/m³ to 35 kg/m³, more preferably 28 kg/m³ to 32 kg/m³, and most preferably 30 kg/m³.

In the present disclosure, the microalgae can pass through the filter cloths in the first fiber rotary disc filter but not the filter cloths in the second fiber rotary disc filter; and the microalgae comprises one or more of *Chlorella*, *Euglena*, *Dunaliella salina*, and Scenedesmaceae.

In the present disclosure, the microalgae are cultured by using the photo-fermentation system. Taking the photo-fermentation culture of *Chlorella* as an example, 10 L *Chlorella* species are inoculated into a 100 L fermentation pond filled with sterilized culture medium, and the light intensity is continuously increased from 200 u mol/(m²·s) to 500 μmol/(m²·s) according to the change of cell density, the pH of the culture medium is 6.0, the temperature is 30° ° C., the stirring speed is 150 r/min, the aeration rate is 200 L/min, and the culture is finished after being carried out for 120 h. The fed-batch feeding method during culture is as follows: according to the growth condition of the of *Chlorella*, several liters of 500 g/L glucose mother liquor are added at one time every 12 hours to ensure the glucose concentration in the culture medium to be 20 ~ 25 g/L: and 1 mol/L concentrated nitric acid is automatically replenished as a nitrogen source.

In the present disclosure, the microalgae species preferably comprise one or more of *Chlorella*, *Euglena*, *Dunaliella salina*, and Scenedesmaceae.

After adding the pre-domesticated microalgae species, the fish fry is released, and the feed is added into the fishpond every 3.5 h to 4.5 h.

In the present disclosure, when the fish fry is salmon, when the weight of more than 80% of single fish is 20 g, the initial influent flow rate is preferably 30 m³/h to 35 m³/h, more preferably 35 m³/h: when the weight of more than 80% of the single fish is 100 g, the initial influent flow rate is preferably 35 m³/h to 40 m³/h, more preferably 40 m³/h: when the weight of more than 80% of the single fish is 200 g to 500 g, the initial influent flow rate is preferably 45 m³/h to 50 m³/h, more preferably 45 m³/h: when the weight of more than 80% of the single fish is 500 g to 2,000 g, the initial influent flow rate is preferably 50 m³/h to 60 m³/h, more preferably 60 m³/h; when the weight of more than 80% of the single fish is 2,000 g to 3,500 g, the initial influent flow rate is preferably 60 m³/h to 70 m³/h, more preferably 70 m³/h. When the fish fry is Schizothoraxdavidi, the initial influent flow rate is preferably controlled to be 28 m³/h to 32 m³/h, more preferably 30 m³/h, and the initial effluent flow rate is preferably 28 m³/h to 32 m³/h, more preferably 30 m³/h. In the present disclosure, with the growth of the cultured fish fry, different influent flow rates and effluent flow rates are set for different fish culture densities, when the aquaculture density of the water body is greater than or equal to 30 kg/m³ and less than 60 kg/m³, the water inlet flow and the water outlet flow are respectively set to be 35 m³/h to 45 m³/h, preferably 38 m³/h to 42 m³/h, more preferably 40 m³/h: when the aquaculture density of the water body is greater than or equal to 60 kg/m³ and less than 100 kg/m³, the water inlet flow and the water outlet flow are respectively set to be 55 m³/h to 65 m³/h, preferably 58 m³/h to 62 m³/h, more preferably 60 m³/h; and when the aquaculture density of the water body is greater than or equal to 100 kg/m³ and less than 200 kg/m³, the water inlet flow and the water outlet flow are respectively set to be 70 m³/h to 90 m³/h, preferably 75 m³/h to 85 m³/h, more preferably 80 m³/h.

Preferably, when the aquaculture density of the water body is greater than or equal to 30 kg/m³ and less than 60 kg/m³, the water inlet flow and the water outlet flow are respectively set to be 35 m³/h to 45 m³/h; when the aquaculture density of the water body is greater than or equal to 60 kg/m³ and less than 100 kg/m³, the water inlet flow and the water outlet flow are respectively set to be 55 m³/h to 65 m³/h; and when the aquaculture density of the water body is greater than or equal to 100 kg/m³ and less than 200 kg/m³, the water inlet flow and the water outlet flow are respectively set to be 70 m³/h to 90 m³/h.

In the present disclosure, during aquaculture, the dissolved oxygen in the aquaculture water body is 5 mg/L to 12 mg/L.

In the present disclosure, the feed is fed into the fishpond every 4 h preferably. In the present disclosure, when the weight of a single fish is 30 g to 50 g, the feeding amount of the feed is preferably 2.5% to 3% of the total weight of fish in the aquaculture water body: the adding amount of the algae species is preferably 800 L/100 m³ water body to 1,200 L/100 m³ water body. When the weight of a single fish is 200 g to 500 g, the feeding amount of the feed is preferably 2% to 2.5% of the total weight of fish in the aquaculture water body.

During aquaculture, when the microalgae are at the final stage of the growth stationary phase and about to enter the decline phase, the first fiber rotary disc filter is turned off and the second fiber rotary disc filter is turned on to prevent the microalgae from returning to the fishpond. The captured microalgae enter the magnetic loading flocculation system by the backwash device for further treatment, and a certain volume of pre-cultured high-activity microalgae are added into the fishpond to make the algae density in the aquaculture water body be 50-1,000 mg/L, and the fish can be harvested after 150 days to 200 days.

In the present disclosure, the adding of microalgae has multiple effects. On the one hand, the microalgae can effectively remove soluble pollutants such as nitrogen and phosphorus in water body, after the microalgae are added, soluble pollutants such as nitrogen and phosphorus in water body can be used as nutrients to achieve the growth and reproduction of microalgae in water. On the other hand, the growth and reproduction of microalgae can release oxygen, and the released oxygen can be used by fish of the water body, thus reducing the demand for artificial aeration. Further, the *Chlorella* also has an inhibitory effect, which can inhibit the growth of harmful bacteria in water body, maintain the water body environment and prevent the fish in water body from being infected with the harmful bacteria. In addition, the microalgae added into the water body may also be used as the feed for fish to eat. Meanwhile, the polysaccharides produced on the surface of microalgae can agglomerate and wrap nearby water-insoluble particulate pollutants, which can increase the particle diameter and further increase the sedimentation of particulate pollutants, thus facilitating rapid separation of the particulate pollutants.

During aquaculture, the oxygen aeration is carried out in the fish and algae farming system through an aeration cone, and whether the aeration is needed or not can be determined according to the concentration of the dissolved oxygen. The dissolved oxygen of the fish and algae farming system is maintained above 7.0 mg/L; and when the dissolved oxygen of the fish and algae farming system is less than 7.0 mg/L, the aeration is needed.

The fish can be harvested after being cultured for 150 days to 200 days. In the present disclosure, when the fish is Oncorhynchus mykisst, the weight of the released fish fry is 4.5 g to 5.5 g, preferably, the fish can be harvested after being cultured for 170 days to 190 days, and the weight of the harvested Oncorhynchus mykisst is 450 g to 550 g. When the fish is salmon, the weight of the released fish fry is 4.5 g to 5.5 g, and the weight of the harvested salmon is 2,000 g to 3,600 g.

The industrialized fish and algae farming system with recirculating water is carried out by using the aquaculture system. During the aquaculture, the microalgae are added into the fish and algae farming system periodically, which can transform nutrients such as $CO_2$, nitrogen and phosphorus in the water into own materials of algae cells to purify the water quality in the fishpond. By utilizing the fiber rotary disc filter system and the magnetic loading flocculation, suspended matters, grease, algae, bacteria, viruses and the like in aquaculture water body can be rapidly and fully removed, thus achieving aquaculture sewage. The sewage discharge is zero, and the recirculating aquaculture with high density, high stability and low energy consumption can be really achieved.

The technical solutions provided by the present disclosure are described in detail below with reference to the embodiments, but they should not be understood as limiting the scope of protection of the present disclosure.

Embodiment 1

In accordance with the system, an industrialized fish and algae farming system with recirculating water is employed. The industrialized fish and algae farming system with recirculating water comprises a fish and algae farming system, an algae culture system and a water treatment system. The fish and algae farming system is a fishpond with a water body of 100 m³ constructed by polypropylene plates, through which the aquaculture output can reach 15 tons, the aquaculture density can reach 150 kg/m³, and the weight of a single fish can reach more than 3 kg. At present, the experimental fish species is salmon, with a single weight of 3.6 kg/tail. The energy consumption of 100 m³ water body in the normal recirculating aquaculture is 20 kw/h, and the energy consumption of 100 m³ of aquaculture water body in the industrialized fish and algae farming system with recirculating water is 4 kw/h. See Table 1 for detailed data.

TABLE 1

Comparison between fish and algae farming system with recirculating water in the embodiment and conventional recirculating aquaculture system

| | Aquaculture water body | Aquaculture structure | Aquaculture species | Aquaculture specification | Maximum density | Maximum yield |
|---|---|---|---|---|---|---|
| Industrialized fish and algae farming system with recirculating water | 100 m³ | pp plate fish pond | Salmon | 5 g to 3,500 g | 150 kg/m³ | 15 tons |

TABLE 1-continued

Comparison between fish and algae farming system with recirculating water in the embodiment and conventional recirculating aquaculture system

| Conventional fish and algae recirculating aquaculture system | 100 m$^3$ | Cement pond/2 | Salmon | 5 g to 3,500 g | 80 kg/m$^3$ | 8 tons |
|---|---|---|---|---|---|---|

| | Energy consumption | | | | | | |
|---|---|---|---|---|---|---|---|
| | Dissolved oxygen pump | Oxygen generator | Circulating pump | Magnetic flocculation | Biological filter | Micro-filter | Total energy consumption |
| Industrialized fish and algae farming system with recirculating water | 1.8 kw  1.8 kw | 2.2 kw/2  1.1 kw/h | 0.8 kw  0.8 kw/h | 8 kw/32  0.25 kw/h | Not set | Not set | 3.95 kw/h |
| Conventional fish and algae recirculating aquaculture system | 1.8 kw* 2 | 2.2 kw/2 | 0.8 kw* 2 | | 1.8 kw/h | 1.8 kw/h | 13.2 kw/h |

The above embodiment is only a preferred embodiment of the present disclosure. It should be noted that, for the person skilled in the art, several improvements and modifications may be further made without departing from the principle of the present disclosure, and these improvements and modifications should also be deemed to fall into the protection scope of the present disclosure.

What is claimed is:

1. An industrialized fish and algae farming system with recirculating water, comprising: a fish and algae farming system, a fiber rotary disc filter system, and a magnetic loading flocculation system:
wherein the fish and algae farming system comprises a fishpond body, a water inlet device, and a water outlet device:
the fiber rotary disc filter system comprises a first fiber rotary disc filter device and a second fiber rotary disc filter device; the first fiber rotary disc filter device is located in a first filter pond: the second fiber rotary disc filter device is located in a second filter pond; the first fiber rotary disc filter device and the second fiber rotary disc filter device each comprise a fiber rotary disc filter, a backwash device, a sludge discharge device, and a supporting electric control device; the first fiber rotary disc filter device and the second fiber rotary disc filter device have equal filtration flux for same aquaculture sewage: filtering pores of filter cloths in a first fiber rotary disc filter have a diameter ranging from 15 μm to 30 μm: filtering pores of filter cloths in a second fiber rotary disc filter have a diameter ranging from 1 μm to 5 μm: a filtered water collecting tank is arranged between the first filter pond and the second filter pond: the filtered water collecting tank is provided with a filtered water outlet: the first fiber rotary disc filter device and the second fiber rotary disc filter device share the filtered water collecting tank, the filtered water outlet, a back suction pump and a drain outlet:
the water outlet device of the fish and algae farming system communicates with the first filter pond and the second filter pond through pipelines, respectively:
the filtered water outlet of the fiber rotary disc filter system communicates with the water inlet device of the fish and algae farming system through a pipeline:
the drain outlet of the fiber rotary disc filter system communicates with a water inlet of the magnetic loading flocculation system through a pipeline:
the magnetic loading flocculation system comprises a mixing pond, a coagulation pond, a flocculation pond, a sedimentation pond, a magnetic powder recovery device, and a sludge dewatering device:
the sedimentation pond of the magnetic loading flocculation system is provided with a clarified water outlet, and the clarified water outlet communicates with the first filter pond and the second filter pond through pipelines.

2. The industrialized fish and algae farming system with recirculating water according to claim 1, wherein the water inlet device comprises a plurality of water inlet pipes, the water inlet pipes are distributed on a side wall of the fishpond body, and fishpond water inlets are arranged in a tangential direction at equal intervals.

3. The industrialized fish and algae farming system with recirculating water according to claim 1, wherein the fiber rotary disc filter comprises a central rotary drum and a rotary disc; the rotary disc is fixed around the central rotary drum and communicates with the central rotary drum through a communication hole: both sides of the rotary disc are provided with the filter cloths; the first fiber rotary disc filter device and the second fiber rotary disc filter device have equal filtration flux for same aquaculture sewage.

4. The industrialized fish and algae farming system with recirculating water according to claim 1, wherein the sludge discharge device comprises sludge discharge pipes arranged at bottoms of the first filter pond and the second filter pond, and the sludge discharge pipes communicate with the back suction pump through pipelines; and the sludge discharge pipes in the first filter pond and the second filter pond are provided with electric valves.

5. The industrialized fish and algae farming system with recirculating water according to claim 1, wherein the magnetic loading flocculation system comprises the mixing pond, the coagulation pond, the flocculation pond, the sedimentation pond, the magnetic powder recovery device, and the sludge dewatering device communicating to one another in sequence.

* * * * *